May 31, 1960 R. S. HALLSTEIN 2,938,551
FILLING DEVICE
Filed April 10, 1957 2 Sheets-Sheet 1
*FIG.1.*
*FIG.3.*
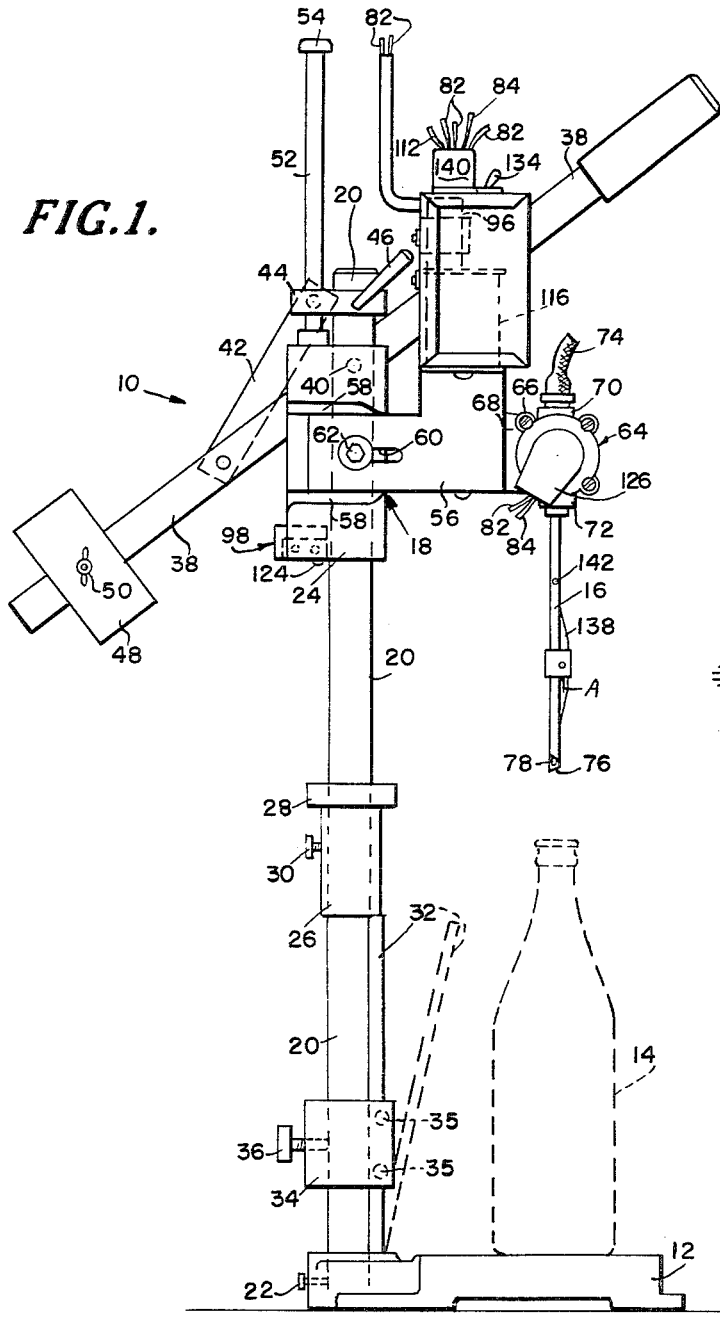
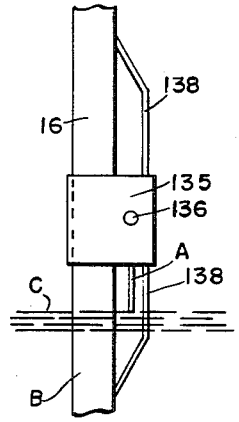
INVENTOR
ROBERT S. HALLSTEIN
BY Cushman, Darby & Cushman
ATTORNEYS May 31, 1960     R. S. HALLSTEIN     2,938,551
FILLING DEVICE Filed April 10, 1957                          2 Sheets-Sheet 2

*INVENTOR*
ROBERT S. HALLSTEIN
BY Cushman, Darby & Cushman
*ATTORNEYS*

United States Patent Office 2,938,551
Patented May 31, 1960

2,938,551

FILLING DEVICE

Robert S. Hallstein, Elmira, N.Y., assignor to Thatcher Glass Manufacturing Company, Inc., Elmira, N.Y., a corporation of New York Filed Apr. 10, 1957, Ser. No. 652,015

10 Claims. (Cl. 141—227)

This invention relates to container filling devices and to filling devices adapted to be utilized in measuring the capacity of containers.

A well known method of measuring the internal capacity of containers is to fill the container to a predetermined height and determine the weight of liquid therein, for example by weighing the container before and after filling. The container capacity is then calculated on the basis of the weight of liquid. In making container capacity ratings by this method, it is conventional practice for container manufacturers to utilize hand-filling machines wherein the accuracy of the filling operation is dependent to a large degree on the mental and physical attitude of the operator. Hence, miscalculations based on human errors are frequently and undesirably encountered.

Numerous devices have been developed for automatically filling containers to predetermined levels. However, such devices for the most part have been structurally complicated and expensive, and additionally are usually designed to be employed in large machinery for filling receptacles with a liquid to be marketed, as distinguished from use in container manufacture to determine container capacity.

Automatic filling devices conveniently operate on a dispensed volume principle or a timed flow principle, and as is evident, would not fill successive similar containers to the same predetermined level if there were differences in the capacity of the individual containers. Hence, manufacturers have likewise found these devices to be unsatisfactory in the method of measuring container capacities.

Accordingly, it is an important object of the invention to provide a novel container filling device facilitating accurate determinations of container capacity.

Another object resides in the provision of an improved container filling device particularly adapted for automatically filling containers to a predetermined level irrespective of variations in the capacity of similar containers being filled.

A further object resides in the provision of novel means, in a container filling device, for initiating and terminating the flow of liquid to the container.

Further objects and advantages of the invention will be in part obvious and in part pointed out hereinafter.

The novel features of the invention may be best made clear from the following description and accompanying drawings in which:

Figure 1 is a side elevational view of a container filling device of the invention shown in non-filling position with respect to a container shown in phantom lines.

Figure 2 is a view correspoding to Figure 1 with the filling device shown in operative filling position.

Figure 3 is a fragmentary, enlarged view of the liquid discharge member of the filling device of Figure 1, and Figure 4 is a schematic wiring diagram for an electrical circuit utilized with the filling device of Figure 1.

The invention contemplates a filling device 10 having a base 12 for supporting an open top container 14 in upright position beneath a liquid discharge member 16. In the preferred embodiment, the liquid discharge member is mounted above the base for limited vertical movement whereby it can be moved by manually operated means, as will be subsequently described, into the open top of the container. The invention further contemplates a novel arrangement for automatically initiating and terminating flow of liquid through discharge member so that the level to which each container is filled will be predetermined and substantially constant, although adjustable means are included to adapt the filling device for filling larger or smaller containers to other predetermined heights. This control arrangement and adjustable means prevent liquid flow through discharge member except when it is at the lower limit position of its travel, at which time flow commences and continues until the liquid level in the container reaches a predetermined height. At that time flow is automatically terminated and the discharge member may then be moved upwardly to non-filling position.

Referring now to the illustrative embodiment of the invention, the discharge member 16 preferably is connected to a filling head 18 and communicates with a supply of liquid (not shown). Filling head 18 is shown mounted for vertical reciprocal movement on an upright rod 20 attached to base 12. The base 12 may be of any convenient construction and configuration having a flat upper surface for supporting the container 14, and the bottom of rod 20 is shown arranged in a suitable hole therein and retained in fixed upright position as by engagement to set screw 22, as shown in Figures 1 and 2.

The filling head 18 may include a generally cylindrical collar or sleeve 24 slidably embracing rod 20, and a lower stop collar 26 having a top radial flange 28 is vertically and slidably adjustably secured to rod 20 beneath sleeve 24. A set screw 30 is shown for retaining collar 26 in adjusted position. As is evident, downward movement of the filling head 18 will be arrested when the sleeve 24 thereof abuts flange 28 on collar 26 whereby the discharge member 16 will consequently be disposed within container 14 at a predetermined height therein. The original positioning of stop collar 26 may be effected by use of a gauge means, such as gauge bar 32 and holder 34 therefor. Holder 34 is suitably connected to rod 20 below collar 26 and secured in position as by set screw 36. The right side of this holder, as viewed in the drawings, is provided with suitable means for engaging bar 32 and disposing it in juxtaposition to rod 20, extending upwardly from base 12 for engagement of its upper end by the collar 26, which is then held in this position by screw 30. Such suitable means on the holder 34 may include a vertical slot of a sufficient size to enable the bar 32 to be arranged in desired gauging position as by movement thereof between the dotted and full line positions indicated in Figure 1, and conventional spring loaded detents indicated at 35 may be suitably provided in the holder 34 for engagement with bar 32 to detachably hold it in the position thereof shown in Figure 2. It will be understood that set screws, in lieu of detents 35, may be utilized for the same purpose.

The filling head 18 preferably is movable by manually operated means. Such means is shown in the illustrative embodiment as including a lever 38 pivoted to the sleeve 24 as at 40 and extending to either side thereof. A link 42 is connected at its ends to the lever 38 and to an upper stop collar 44, as shown. Collar 44 is conveniently secured to the upper end of rod 20 as by set screw 46 extending therethrough for tightening against rod 20. A weight 48 may be fitted over the left end of the lever 38 and attached thereto as by screw 50 for continuously urging it to pivot about the axis of connection 40 in a counterclockwise direction. As is evident, any suitable biasing means such as a spring may be provided for this purpose in lieu of weight 48.

The counterclockwise pivotal movement of lever 38 and the consequent and concomitant upward movement of sleeve 24 preferably are limited when the position of Figure 1 is reached, as by engagement of lever 38 to collar 44 in the manner indicated in this figure. Vertical bar 52 may be provided extending from the top of filling head sleeve 24, passing through a hole in collar 44 and terminating in an enlarged upper end 54 to furnish additional guiding support for the movement of the filling head 18 and also to prevent the discharge member 16 on the filling head from being moved downwardly an undesired or excessive distance in the event stop collar 26 is inadvertently set too low on rod 20. That is to say, enlargement 54 would strike collar 44 to arrest downward movement of the filling head and discharge member if collar 26 is set too low.

An angle bracket 56 is shown mounted on sleeve 24 with the horizontal leg thereof slidably disposed between vertically spaced, horizontal guides 58 on the sleeve. An elongated opening 60 is formed in the horizontal leg of the bracket through which screw 62 may be inserted for threaded engagement in the sleeve whereby limited adjustment of the horizontal positioning of discharge member 16, arranged at the right end of the bracket, may be effected. Member 16 preferably is in the form of a hollow filling tube connected at its upper end to a valve casing 64 which is suitably attached to the bracket 56 as by screw 66 engagement to a lateral projection 68 on the bracket. The valve casing 64 preferably contains any conventional two position, on-off and normally closed valve V and has an upper valve inlet 70 and a lower valve outlet 72 disposed in fluid communication when the valve is opened for flow of liquid from the supply through the valve and then through the hollow tubular discharge member 16 communicating with outlet 72. Conduit 74 is conventionally connected to the valve casing in communication with the valve inlet 70 and extending to the liquid supply.

The bottom of tube 16 preferably is closed by an inclined wall 76, as best seen in Figure 1, and a discharge outlet or orifice 78 is formed in the side wall of the tube slightly above the bottom wall. By virtue of this structure, the liquid will be deflected in a generally lateral direction as it discharges from the tube through outlet 78 whereby it will impinge on a side wall of the container to minimize turbulence during the filling operation.

The novel electrical control arrangement for initiating and terminating the spraying operation preferably includes an electromagnet or solenoid, indicated schematically in Figure 4 by numeral 80 and operatively connected to the normally closed valve V in casing 64 as by armature or plunger 81 (Figure 4) for opening this valve when energized. In the illustrative embodiment of the electrical circuit appearing diagrammatically in Figure 4, the electromagnet or solenoid winding 80 is connected by leads 82, 84 to a source of current 86, such as the standard 110 volt, 60 cycle source. Arranged in series with lead 82 is a normally closed relay 88 including switch lever 90, contact points 92, 94 and winding 96. A second switch, indicated at 98, is also disposed in series with lead 82, and preferably is a normally open microswitch. Lead 84 passes through contact points 100, 102 of a double pole switch 104 to be closed by switch lever section 106.

The other contact points 108, 110 in the switch 104 are connected respectively to leads 112, 114. Lead 114 includes the winding 96 in series therewith and may be grounded, as shown. Lead 112 is connected in series to a source of current 116 and a first electrode A, as shown. Source 116 may be of any conventional form, such as a 22½ volt battery. And arranged adjacent electrode A is a second electrode B grounded as shown. Contact points 108, 110 are adapted to be closed by the other section 122 of the lever for switch 104.

The arrangement of the various electrical components in the illustrative embodiment of the mechanical structure of the invention is as follows. Microswitch 98 may be in the form of a casing arranged at the bottom of sleeve 24, such as by disposing it in a recess in the sleeve and securing it therein by suitable means. The actuator for the microswitch is shown as a button 124 (Figure 1) projecting below the bottom planar surface of sleeve 24 and positioned adjacent rod 20 so that it will be depressed on contact with flange 28 of collar 26 to close the switch when the sleeve 24 is moved to the position of Figure 2. Solenoid 80 is arranged in a housing or pipe 126 suitably connected to the valve casing 64 and leads 82, 84 are shown fragmentarily in Figures 1 and 2 as extending outwardly from housing 126.

A container or box 128 is mounted above bracket 56 as by being fastened to an outturned horizontal platform or ledge 130 on the bracket 56, and suitably arranged in the box 128 are the relay winding 96 and battery 116. A conduit 132 encasing leads 82, 84 extends from box 128 to the source 86 and the finger engageable lever 134 for switch 104 is mounted on top of the box, as shown.

As an important feature of my invention, the discharge member 16 functions as electrode B and the electrode A is arranged in juxtaposition therewith. As best seen in Figure 3, the electrode A may depend from a sleeve 135 embracing discharge member 16 and desirably, the electrodes will be normally insulated from each other, such as by making the sleeve 135 of electrically non-conducting material or by any other desired means. The vertical position of sleeve 135 on discharge member 16 may be made adjustable by provision of suitable mounting means, such as a set screw 136. A wire 138, preferably of spring steel, passing through sleeve 135 and having inwardly turned upper and lower ends engaging member 16, as shown in Figure 1, preferably is provided for the primary purpose of protecting against impacts on electrode A which might result in undesired movement thereof.

Although not shown in Figures 1-3, the lead for electrode A is suitably connected thereto and to battery 116 while the discharge member 16, i.e., the second electrode B, may be grounded through the filling head 18, rod 20, and base 12. Similarly, the lead 82 may be connected in any convenient manner to dispose the microswitch 98 in the desired electrical relation shown in Figure 4. If desired, a conventional five-wire contact jack 140 may be arranged at the top of box 128 to facilitate electrical connection of the various leads to the various components of the control circuit, such as in the manner indicated in Figure 4.

In the operation of the aforedescribed filling device, the lower stop collar 26 is set on rod 20 at desired vertical position by means of gauge bar 32 which is selected in accordance with the size of the container and the height to which the container will be filled. The container 14 is then placed upright on base 12 beneath the discharge member 16 and with the open top of the container in vertical alignment with member 16, as shown in Figure 1. The lever 134 of switch 104 is moved to engage sections 106, 122 with contact points 100, 110 respectively so that the control circuitry is now in operable condition. The operator then lowers the right hand end of lever 38 from the Figure 1 to the Figure 2 position thereof with a corresponding downward movement of the filling head until the bottom of sleeve 24 abuts the flange 28 on collar 26. At this time, the discharge member 16 will have entered the open top of the container and is disposed at the predetermined height thereof shown in Figure 2. And, as soon as or slightly before the sleeve 24 reaches its lower limit position, the actuating button 124 engages flange 28 to close microswitch 98 thereby energizing solenoid winding 80 and opening valve V. The liquid, which for example may be water or other conductor of electricity, now flows through the conduit 74, valve V and discharge member 16 to be discharged in a lateral direction through outlet 78 and against the side walls of the container.

The operator holds the filling head 18, through lever 38, in the filling position (i.e. the position of Figure 2) and the liquid level in the container rises to the height wherein the lower portion of the discharge member 16 is submerged and the liquid touches the bottom tip of electrode A. When this level (indicated by letter C in Figure 3) is reached, the normally open circuit including battery 116 is closed through the body of liquid by reason of liquid contact of electrodes A, B and the consequent energization of winding 96 moves switch lever 90 to stop point 94. Winding 80 is accordingly deenergized as a result of the opening of relay 88 and the valve V returns immediately to its closed position thereby terminating the filling operation. As will be understood, any conventional means may be utilized for biasing lever 90 and valve V to closed positions and also for operatively connecting them to their respective windings 96, 80.

As soon as the operator detects the termination of filling, he raises the filling head whereby the microswitch will immediately return to its open position insuring against the reopening of valve V when the winding 96 is deenergized and relay 88 returns to its closed position, which reopening would otherwise occur when the liquid no longer contacts the electrodes, opening that circuit and closing the circuit containing winding 80.

Another important feature of the invention is that it contemplates the provision of means for the introduction into the container of an amount of liquid equivalent in volume to the volume displaced by the submerged portion of tube 16. That is to say, after tube 16 is raised from the body of liquid in the container 14 when a filling operation is terminated, means are provided whereby an additional amount of liquid will be introduced into the container to compensate for the fall in the liquid level occasioned by removal of tube 16 from its partially submerged filling position (see Figure 3). Such means preferably is in the form of an aperture or vent hole 142 formed in the side wall of tube 16. The vertical positioning of vent 142 on tube 16, as will be understood, is determined by the external volume of tube 16 below the elevation of the bottom tip of electrode A (i.e. the submerged portion below liquid level C), and also by the cross-sectional area of the flow passage in tube 16. As the tube 16 is raised from the liquid following a filling operation, the air entering vent hole 142 enables the liquid contained in the tube below such hole to be discharged through the outlet 78 into the container. Hence, containers may be filled to the same predetermined height or level with a high degree of precision and accuracy requiring no particular skill or judgment on the part of the operator.

It will be appreciated that the bottle filling device of the invention has particularly utility in the determinations of container capacities, obviating the necessity of utilizing expensive structures and also the necessity of relying on the operator's skill and judgment. Once the device has been preset (i.e. positioning of collar 26) it will function to fill successive containers to the same predetermined height irrespective of variances in the container capacities. This feature makes it possible to fill containers to the same predetermined level even though the difference in their capacities may be substantial and intended; for example, where one container is twice the capacity of another. In each case the container in question is filled to the same desired and predetermined level and then it is weighed to determine its capacity in a manner well understood to those skilled in the art.

In operation of a practical embodiment of the invention, it was found that by designing the circuit including battery 116 to operate on a small current, the electrodes A and B of the device will be insensitive to water vapor and/or small bubbles normally produced at the liquid surface as it rises in the container. That is, current will pass through the electrodes only when the liquid in the container rises to desired level C of Figure 3. In this regard, the turbulence minimizing feature of the outlet 78 will further insure against premature closing of valve V during filling, while the low voltage of battery 116 reduces shock hazards to personnel. It might be noted that should there be a failure in the power supply at 86, winding 80 could not be energized and valve V would remain closed.

It will thus be seen that the objects of this invention have been fully and effectively accomplished. It will be realized, however, that the foregoing specific embodiment has been shown and described only for the purpose of illustrating the principles of the invention and is subject to extensive change without departure from such principles. Therefore, this invention includes all modifications encompased within the spirit and scope of the appended claims.

I claim:

1. In a container filling device: a base for supporting an open top container in upright position, a vertical rod extending upwardly from said base, a liquid discharge member positioned above said base, means for connecting said discharge member to said rod for vertical reciprocatory movement of said member relative to said base, means adjustably mounted on said rod for limiting the downward movement of said member to a position wherein it enters the open top of a container supported on said base, a liquid supplying passageway communicating with said discharge member, a normally closed valve in said passageway for controlling liquid flow to said discharge member, an electromagnet operatively connected to said valve to move the latter to open position when energized, first means for energizing said electromagnet only when said discharge member is at its lower limit position and preventing energization of said electromagnet at all other positions of said discharge member, and second means responsive to liquid level in the container for deenergizing said electromagnet when the liquid in the container reaches a predetermined level during the time said discharge member is at its lower limit position.

2. The device defined in claim 1 wherein gauge means are juxtaposed to said rod and resting on said base for predetermined positioning of said means adjustably mounted on said rod.

3. The device defined in claim 1 wherein said first means is a normally open switch arranged in a circuit including said electromagnet.

4. The device defined in claim 3 wherein said second means includes an electrical circuit having spaced electrodes therein, said electrodes being operative to open said circuit when the liquid in the container reaches said predetermined height, and said discharge member constituting one of said electrodes.

5. In a container filling device: a base, an open top container resting in upright position on said base, a vertical rod mounted on said base and extending upwardly therefrom, a sleeve slidably mounted on said rod for vertical movement relative thereto, a stop adjustably mounted on said rod below said sleeve for arresting downward movement of said sleeve, a liquid discharge member connected to said sleeve, said discharge member being in the form of a tube aligned with the open top of said container, means for normally disposing said tube above said container, said tube entering the container and being disposed at a predetermined height therein when said sleeve is moved downwardly into a position abutting said stop, a liquid supplying passageway communicating with said discharge member, a normally closed valve in said passageway for controlling liquid flow to said tube, means for opening said valve when said tube is at said predetermined height to initiate flow of liquid into said container, and means for closing said valve when the liquid in said container reaches a predetermined level.

6. The device defined in claim 5 wherein said tube includes an imperforate bottom wall and a discharge opening being formed in a side wall thereof above and adjacent to said bottom wall.

7. The device defined in claim 5 wherein the lower portion of said tube is submerged when the liquid in said container is at said predetermined level, and said tube being provided with a vent hole above the submerged lower portion for freeing a volume of liquid from said tube when it is completely withdrawn from the liquid in said container, said volume being equivalent to the volume of the submerged portion of said tube.

8. In a container filling device: a liquid discharge member including a tubular conduit, a stationary platform including means for supporting an open top container beneath and aligned with said tubular conduit, means operatively connecting said tubular conduit to said platform for vertical reciprocation of said tubular conduit so that said conduit is movable downwardly into the open top of the container to a predetermined height therein, operating lever operatively connected to said platform and said conduit for effecting vertical reciprocation of said conduit relative to said platform, a valve controlling the flow of liquid to said tubular conduit, first means operable in response to downward movement of said tubular conduit to said predetermined height to open said valve and initiate flow of liquid into said container substantially immediately after said tubular conduit reaches said predetermined height, and second means operable to close said valve when the liquid in the container rises to a predetermined level therein, said second means comprising an electrical circuit including spaced electrodes, one of said electrodes being defined by said discharge member, and at least the tip of said electrodes being arranged to be immersed in the liquid in the container when it reaches said predetermined level therein.

9. In a container filling device: a liquid discharge member including a tubular conduit, a stationary platform including means for supporting an open top container beneath and aligned with said tubular conduit, means operatively connecting said tubular conduit to said platform for vertical reciprocation of said tubular conduit so that said conduit is movable downwardly into the open top of the container to a predetermined height therein, operating lever operatively connected to said platform and said conduit for effecting vertical reciprocation of said conduit relative to said platform, a valve controlling the flow of liquid to said tubular conduit, first means operable in response to downward movement of said tubular conduit to said predetermined height to open said valve and initiate flow of liquid into said container substantially immediately after said tubular conduit reaches said predetermined height, and second means operable to close said valve when the liquid in the container rises to a predetermined level therein, said discharge member being partially submerged when the liquid in the container is at said predetermined level, means on said discharge member for introducing a volume of liquid into said container after said valve is closed and said member is completely withdrawn from the liquid in the container, and said volume being equivalent to the volume of the submerged portion of said discharge member.

10. In a container filling device: a liquid discharge member, means for supporting an open top container beneath and aligned with said discharge member, means mounting said discharge member for limited vertical reciprocation so that said member is movable downwardly into the open top of the container to a predetermined height therein, a liquid supplying passageway communicating with said discharge member, a normally closed valve in said passageway upstream from said discharge member for controlling the flow of liquid to said discharge member, actuating means operatively connected to said valve, said actuating means including a first means operable in response to downward movement of said member to said predetermined height to open said valve and initiate flow of liquid into said container, and said actuating means also including a second means defined partly by said discharge member and operable to close said valve when the liquid in the container reaches a predetermined level during the time said discharge member is at said predetermined height, said actuating means comprising an electrical circuit having an electromagnet operatively connected to said valve, said first means including a normally opened switch in said circuit, said second means being operatively connected to a normally closed switch in said circuit and including an electrical circuit having spaced electrodes therein, one of said electrodes being defined by said discharge member and the other of said electrodes being vertically and horizontally spaced from said discharge member, said electrodes being electrically connected through the liquid when said predetermined level thereof is reached.

References Cited in the file of this patent
UNITED STATES PATENTS

| | | |
|---|---|---|
| 554,923 | Fowler | Feb. 18, 1896 |
| 585,264 | Fahrney | June 29, 1897 |
| 1,011,184 | Godfrey et al. | Dec. 12, 1911 |
| 1,284,310 | Gilbert | Nov. 12, 1918 |
| 1,471,238 | Burkhard | Oct. 16, 1923 |
| 1,964,645 | Ostlund | June 26, 1934 |
| 2,319,075 | McKinnis | May 11, 1943 |
| 2,377,796 | McKinnis | June 5, 1945 |
| 2,392,054 | McKinnis | Jan. 1, 1946 |
| 2,461,326 | Kantor et al. | Feb. 8, 1949 |
| 2,717,112 | Ralston | Sept. 6, 1955 |
| 2,792,855 | Walts | May 21, 1957 |